(12) United States Patent
Hinds

(10) Patent No.: US 7,871,124 B1
(45) Date of Patent: Jan. 18, 2011

(54) BUILT-IN BABY SEAT

(76) Inventor: Shakir Hinds, P.O. Box 7448, Freeport, NY (US) 11520

(*) Notice: Subject to any disclaimer, the term of this patent is extended or adjusted under 35 U.S.C. 154(b) by 75 days.

(21) Appl. No.: 12/434,142

(22) Filed: May 1, 2009

(51) Int. Cl.
*A47C 15/00* (2006.01)
(52) U.S. Cl. ..................................................... 297/234
(58) Field of Classification Search .............. 297/94, 297/112, 238, 234, 250.1, 254, 256.1, 256.14, 297/256.16, 1, 3
See application file for complete search history.

(56) References Cited

U.S. PATENT DOCUMENTS

| | | | |
|---|---|---|---|
| 4,756,573 A * | 7/1988 | Simin et al. ............... 297/250.1 |
| 4,900,087 A | 2/1990 | Crisp | |
| 4,936,627 A * | 6/1990 | Guim ........................ 297/238 |
| D333,923 S | 3/1993 | Dainty | |
| 5,282,667 A | 2/1994 | Elton et al. | |
| 5,286,084 A | 2/1994 | Bart | |
| 5,472,260 A | 12/1995 | Czapski et al. | |
| 5,527,093 A | 6/1996 | Park | |
| 5,743,593 A | 4/1998 | Vogt | |
| 6,053,569 A * | 4/2000 | Flyborg ...................... 297/94 |
| 6,494,531 B1 * | 12/2002 | Kim ........................... 297/94 |
| 7,458,635 B2 * | 12/2008 | Mendis et al. .............. 297/238 |
| 2008/0100109 A1 * | 5/2008 | Frank ......................... 297/238 |

* cited by examiner

*Primary Examiner*—Milton Nelson, Jr.
(74) *Attorney, Agent, or Firm*—Kyle Fletcher

(57) ABSTRACT

The invention is an improved child safety seat that is integrated into a vehicle seat back. The seat back rotates vertically to allow the child safety seat to be revealed and integrated into the back of the vehicle seat. The child safety seat is capable of facing either forward or rear.

11 Claims, 5 Drawing Sheets

BUILT-IN BABY SEAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of baby seats, more specifically, baby seats that are built into a car seat of a vehicle.

B. Discussion of the Prior Art

As a preliminary note, it should be stated that there is an ample amount of prior art that deals with baby seats. As will be discussed immediately below, no prior art discloses a baby seat that attaches to a car seat back and can be removed and positioned as either a forward facing or rear-facing baby seat.

The Elton et al. patent (U.S. Pat. No. 5,282,667) discloses a vehicle seat assembly having an integrated child seat with rotatable cushion portion. However, the vehicle seat back of the Elton Patent does not rotate vertically to reveal a child safety seat adorning the back of the vehicle seat back.

The Bart patent (U.S. Pat. No. 5,286,084) discloses a vehicle seat having an integral child seat that is deployed solely by rotating the panel from the stowed position within the seat back to the forwardly extending use position. However, the vehicle seat back of the Bart Patent does not rotate vertically about the center of the seat bottom to reveal a child safety seat adorning the back side of the seat's back.

The Park Patent (U.S. Pat. No. 5,527,093) discloses a child seat which can be withdrawably accommodated in a concave space in a bench-type automotive seat. Again, the child seat of the Park Patent is not mounted to the back side of the seat back and revealed by rotating the seat back vertically.

The Czapski et al. Patent (U.S. Pat. No. 5,472,260) discloses a child seat module integrated with a rear vehicle seat, and including fold-down lower and upper segments, interconnected by a flexible and detachable hinge, and a plastic back panel mounted against the back frame of the bench seat. However, the child seat is not revealed by rotating the seat back vertically.

The Crisp Patent (U.S. Pat. No. 4,900,087) discloses an automobile seat having a built-in child seat that assumes different positions to accommodate infants in a rear facing position and children in a forwardly facing position. However, the automobile seat back of the Crisp Patent does not rotate vertically in order to reveal a child seat integrated into the seat back; and furthermore, the child seat is capable of facing either forward or rear.

The Dainty Patent (U.S. Pat. No. Des. 333,923) illustrates a design for a wall mounted infant seat, which does not depict or illustrate a use with a vehicle seat.

The Vogt Patent (U.S. Pat. No. 5,743,593) discloses a vehicle rear seat assembly having an integral child seat. However, the child seat does not extend from the back of the vehicle bench, and the vehicle bench does not rotate about the seat bottom to reveal the child seat.

While the above-described devices fulfill their respective and particular objects and requirements, they do not describe a baby seat that is built into the back of the seat back and of which the seat back can rotate vertically to reveal the baby seat in either a forward facing or rear facing configuration. In this regard, the built-in baby seat departs from the conventional concepts and designs of the prior art.

BRIEF SUMMARY OF THE INVENTION

The invention is an improved child safety seat that is integrated into a vehicle seat back. The seat back rotates vertically to allow the child safety seat to be revealed and integrated into the back of the vehicle seat. The child safety seat is capable of facing either forward or rear.

An object of the invention is to provide a child safety seat that can be affixed to a seat back.

A further object of the invention is to provide a child seat back that can be either forward facing or rear facing.

A further object of the invention is to provide a seat back that can be rotated and used as a seat for an adult.

These together with additional objects, features and advantages of the built-in baby seat will be readily apparent to those of ordinary skill in the art upon reading the following detailed description of presently preferred, but nonetheless illustrative, embodiments of the built-in baby seat when taken in conjunction with the accompanying drawings.

In this respect, before explaining the current embodiments of the built-in baby seat in detail, it is to be understood that the built-in baby seat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the built-in baby seat. It is therefore important that the claims be regarded as including such equivalent construction insofar as they do not depart from the spirit and scope of the built-in baby seat. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
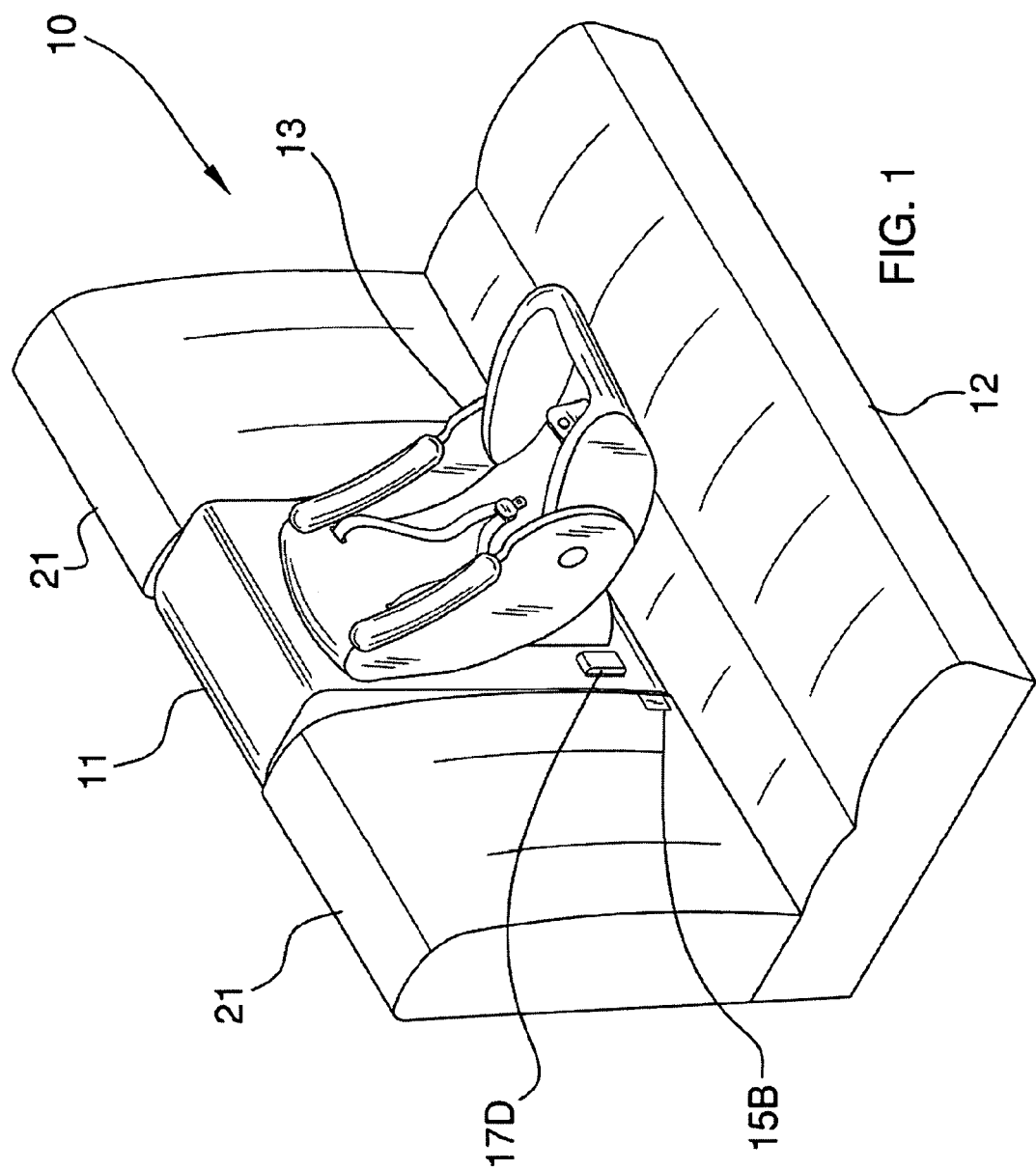
FIG. 1 illustrates an isometric view of the seat back and the child safety seat in a forward facing configuration.
Figure 2:
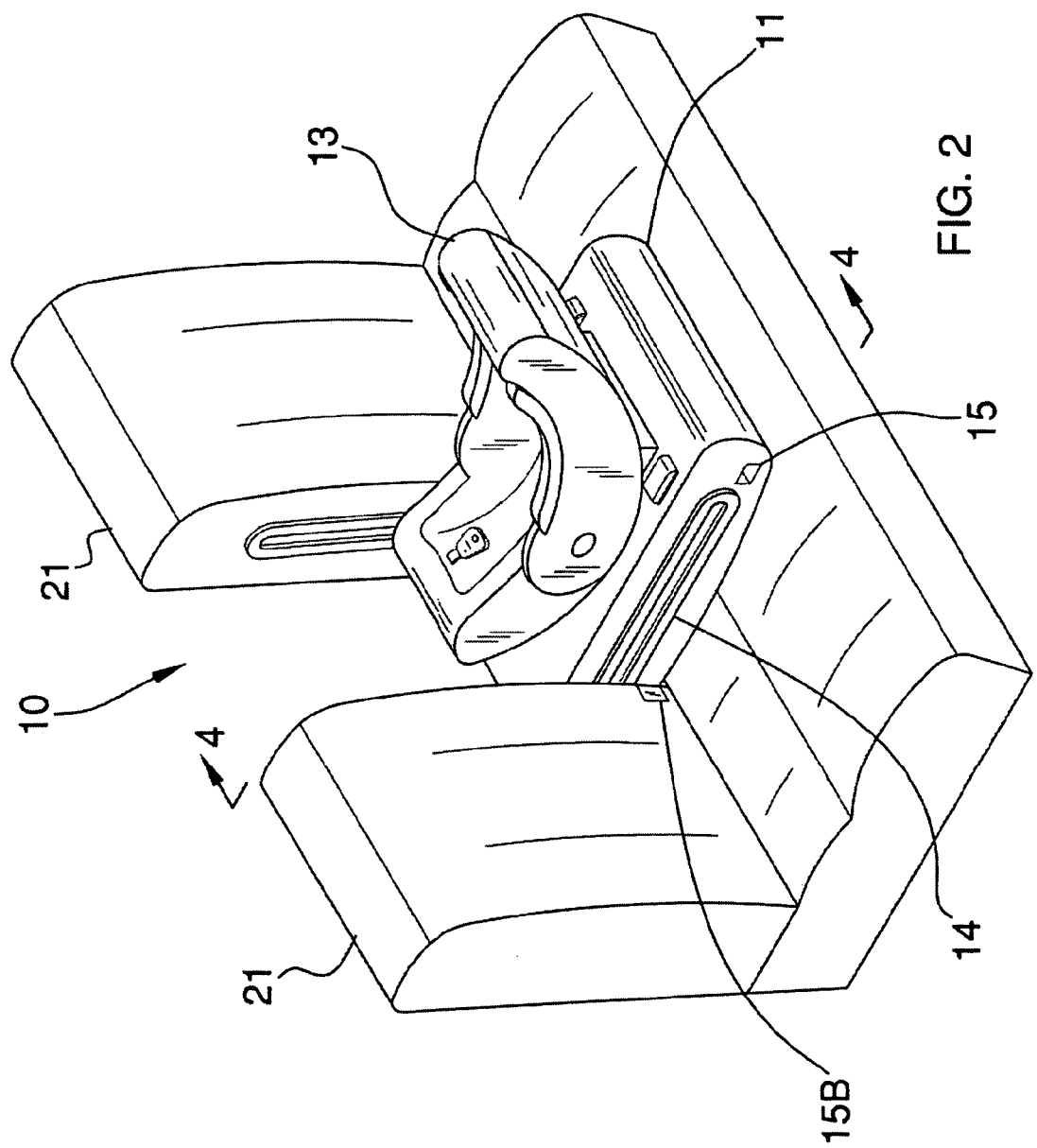
FIG. 2 illustrates an isometric view of the seat back folded down with the child safety seat in a rear facing configuration.
Figure 3:
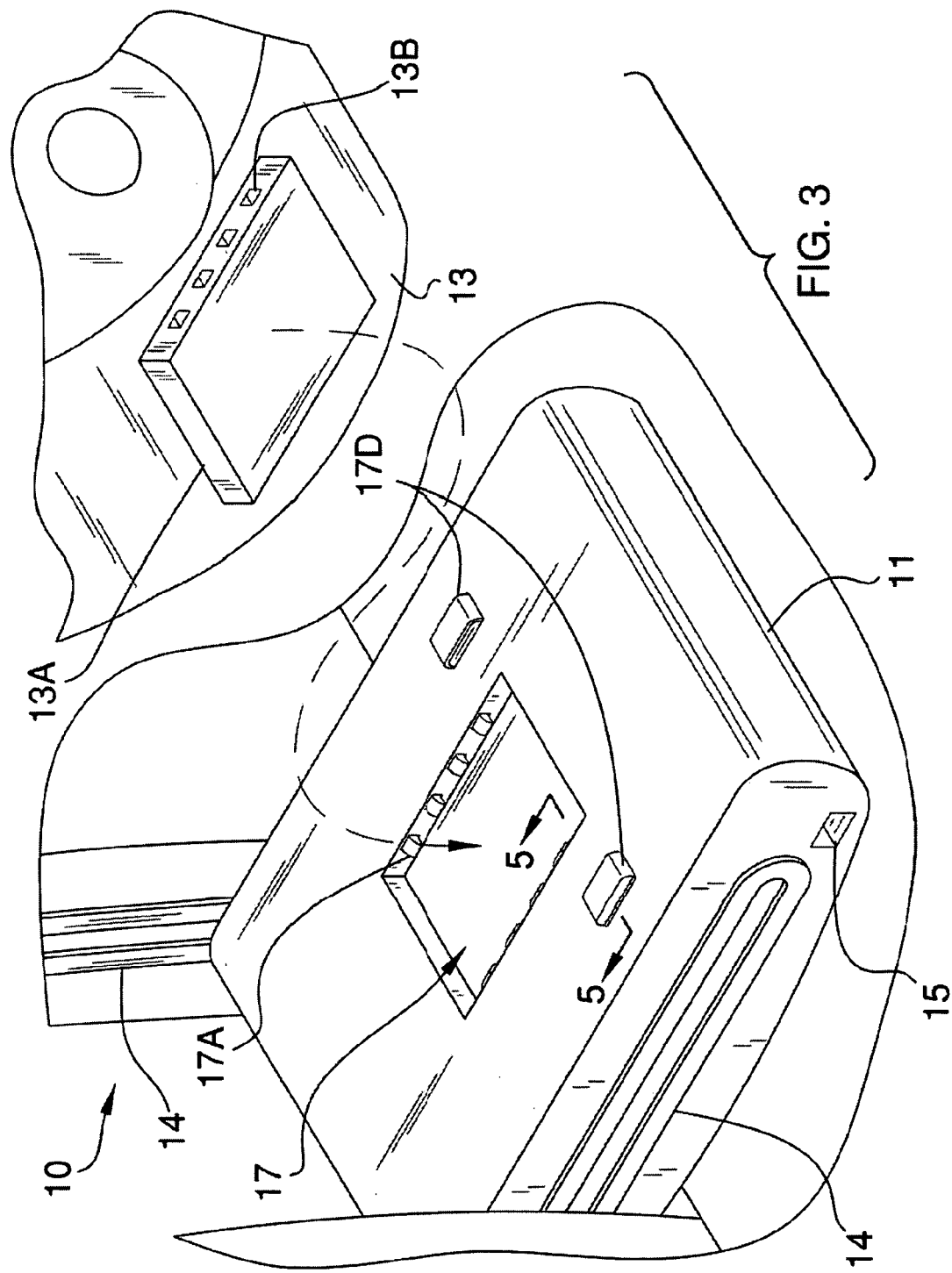
FIG. 3 illustrates a detailed view of the seat back in a horizontal position with the child safety seat removed and exposing the child safety seat locking means.
Figure 4:
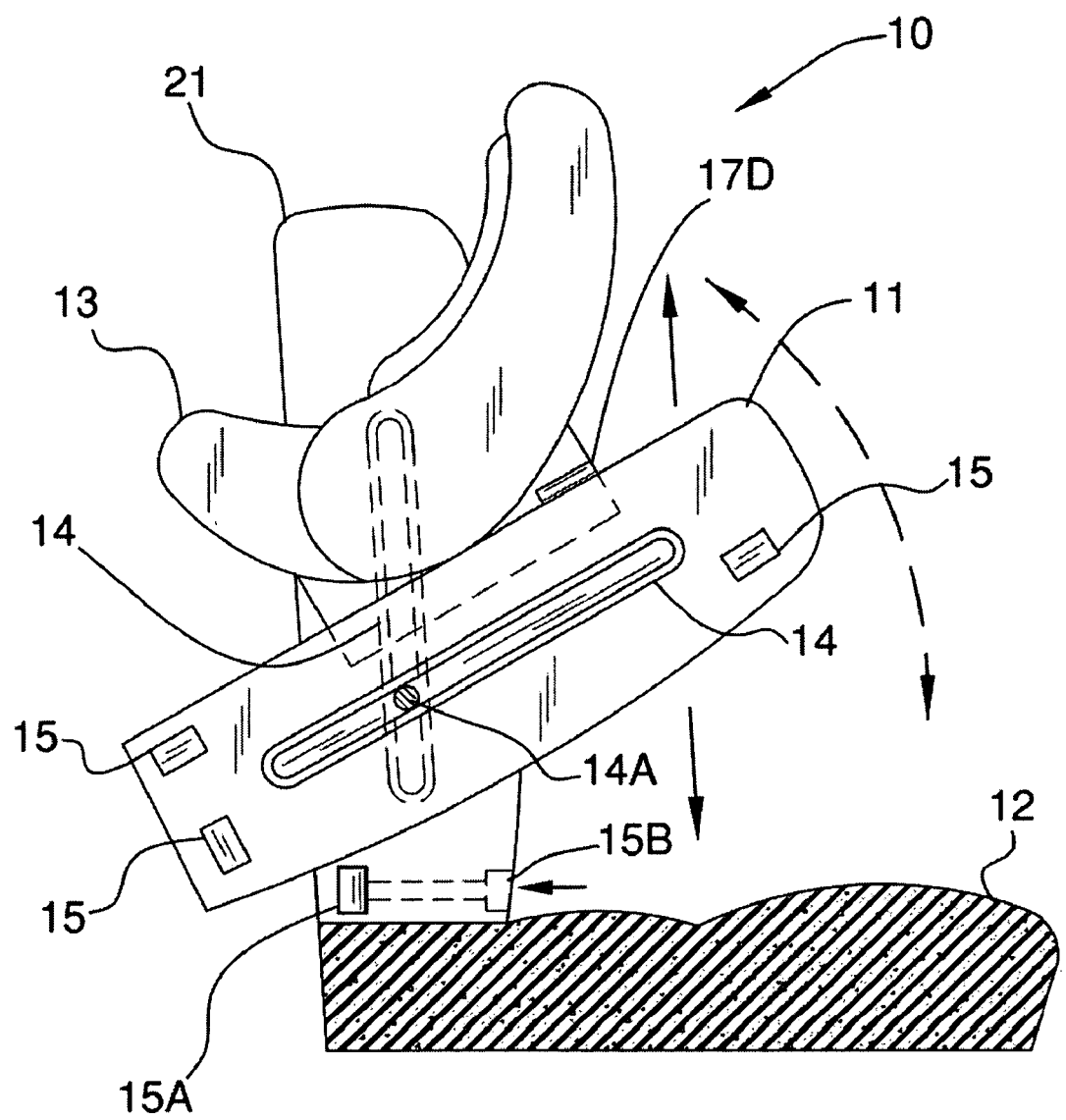
FIG. 4 illustrates a cross-sectional view of the invention along line 4-4 in FIG. 2.
Figure 5:
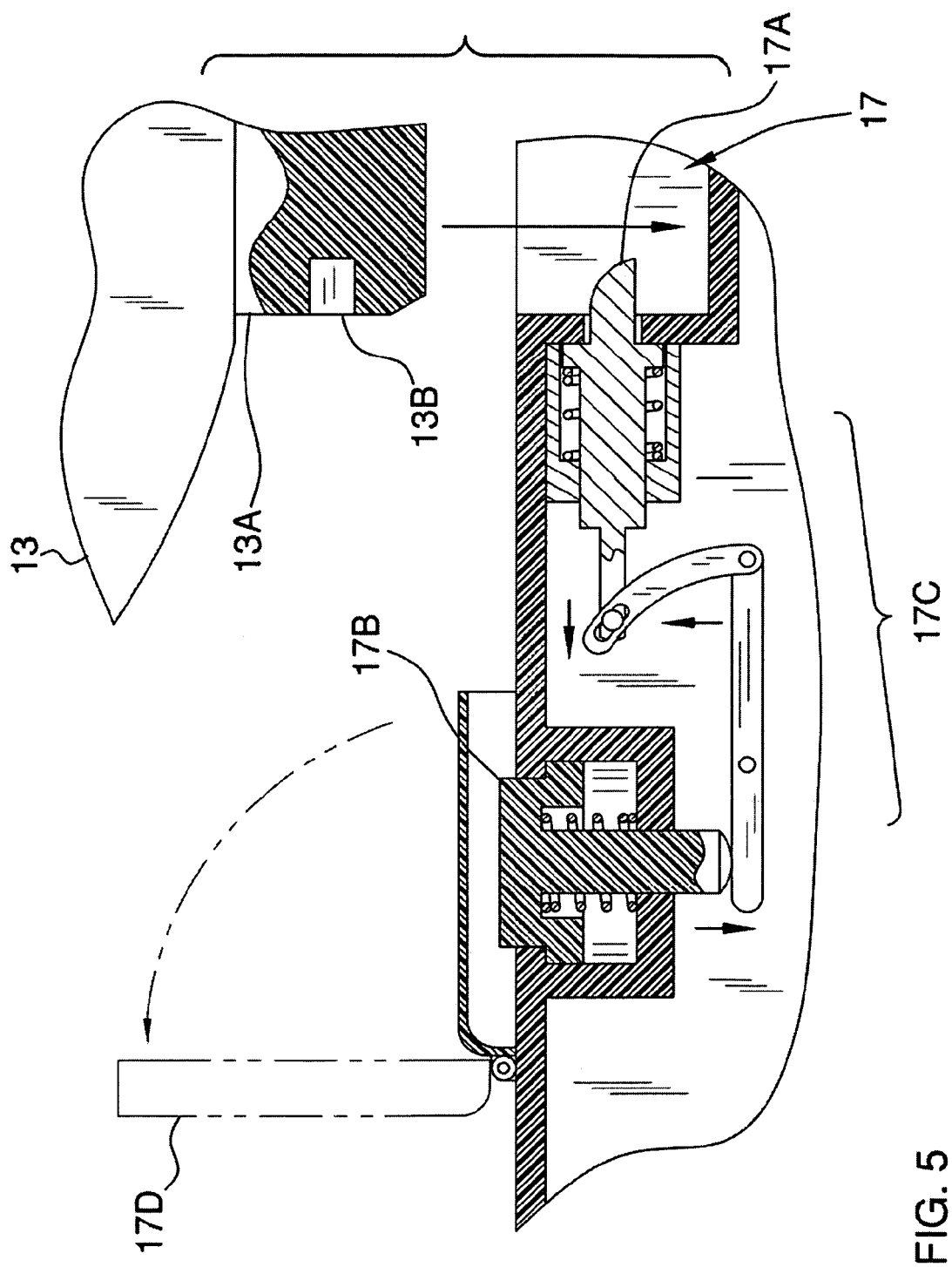
FIG. 5 illustrates a cross-sectional view of the invention along line 5-5 in FIG. 3.

Detailed reference will now be made to the preferred embodiment of the present invention, examples of which are illustrated in FIGS. 1-5. An improved vehicle seat with integrated child safety seat 10 (hereinafter invention) includes a seat back 11, a seat 12, and a child safety seat 13.

The seat back 11 is positioned between exterior seat backs 21, and is capable of vertical rotation via guide tracks 14 positioned on both the seat back 11 and the exterior seat backs 21. A guide pin 14A insures that the seat back 11 is restricted to movement along the guide tracks 14.

A series of locking tab receptacles 15 are located on a first side of the seat back 11, and engage a rotational locking tab 15A located on an interior side of a seat back 21. A rotation release button 15B unlocks the rotational locking tab 15A from the engaged receptacle, and thus enables vertical rotation of the seat back 11. The series of locking tab receptacles 15 enable the seat back 11 to rotate and lock to a forward-facing position (see FIG. 4), a rear-facing position (see FIG. 1), and a horizontal position (see FIG. 2).

Each of the positions mentioned above, enable the child safety seat 13 to lock in either a forward facing configuration (see FIG. 1), a rear-facing configuration (see FIG. 2), or enable the seatback 11 to be used in a normal configuration without the child safety seat 13.

Located on a rear surface of the seat back 11 is a locking tab cavity 17 that includes a plurality of locking tabs 17A. Meanwhile, located on a bottom surface of the child safety seat 13 is a seat base 13A that includes a plurality of locking tab receptacles 13B that correspond to the locking tabs 17A. The locking tabs 17A secure the child safety seat 13 to the rear surface of the seat back 11.

To unlock the child safety seat 13 from the seat back 11, a pair of release buttons 17B must be depressed. The release buttons 17B are located on a left and right side of the tab cavity 17, and each is responsible for the corresponding side of locking tabs 17A. So, upon depression of the left side release buttons 17B, all of the locking tabs 17A on the left side of the cavity 17 will move. Each release button 17B is spring-loaded and connected via linkage(s) 17C to the corresponding locking tabs 17A. The locking tabs 17A are normally extended into the cavity 17.

The release buttons 173 each have a release guard 17D that protects the release buttons 17B from accidental depression of the release buttons 17B. Each release guard 17D is hingedly connected to the seat back 11 and is spring-loaded to remain in a covered state with respect to the release buttons 17B.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A vehicle seat with child safety seat integrated therein comprising:
   a vehicle seat back that is capable of 360 degrees of vertical rotation to expose a rear surface and of which has locking tabs integrated into said rear surface, and wherein the seat back can lock in a front-ward vertical orientation, a rear-ward vertical orientation, or a folded down horizontal orientation;
   a child safety seat having locking tab receptacles can be secured to the rear surface of the seat back by the locking tabs located on said rear surface of the seat back in either a forward facing or rear-facing orientation.

2. The vehicle seat as described in claim 1 wherein the vehicle seat back has a locking mechanism such that the vehicle seat back cannot rotate or move when the locking mechanism is engaged with a rotation release button.

3. The vehicle seat as described in claim 2 wherein the rotation release button is positioned upon an adjacent seat back.

4. The vehicle seat as described in claim 2 wherein the rotation release button is positioned upon an adjacent seat bottom.

5. The vehicle seat as described in claim 1 wherein the locking tabs of the seat back are releasable via a release button such that the child safety seat is released upon movement of the locking tabs.

6. The vehicle seat as described in claim 5 wherein the seat release button is located on the rear surface of the seat back adjacent the locking tabs.

7. The vehicle seat as described in claim 5 wherein two release buttons are located on the rear surface of the seat back and one of which is designated for use in the child safety seat being forward facing and the other release button is designated for use in the child safety seat being rear facing.

8. The vehicle seat, as described in claim 7 wherein the two release buttons are located on a left side of the locking tabs and a right side of the locking tabs, and each release button is responsible for controlling the movement of the corresponding side of locking tabs.

9. The vehicle seat as described in claim 7 wherein the two release buttons are each covered via a release guard to prevent unintended depression of the release button.

10. The vehicle seat as described in claim 9 wherein the release guards are hingedly connected to the rear surface of the seat back.

11. The vehicle seat as described in claim 10 wherein the hinges of the release guard are spring loaded in order to rest the release guards over the release buttons.

* * * * *